United States Patent
Gordon

(10) Patent No.: US 10,299,080 B2
(45) Date of Patent: May 21, 2019

(54) SYSTEM AND METHOD FOR MAXIMIZING MOBILE DEVICE POWER USING INTELLIGENT ATTRIBUTE SELECTION

(71) Applicant: TWOSENSE, INC., Brooklyn, NY (US)

(72) Inventor: Dawud Gordon, Brooklyn, NY (US)

(73) Assignee: TwoSense, Inc., Brooklyn, NY (US)

( * ) Notice: Subject to any disclaimer, the term of this patent is extended or adjusted under 35 U.S.C. 154(b) by 0 days.

(21) Appl. No.: 15/796,518

(22) Filed: Oct. 27, 2017

(65) Prior Publication Data

US 2018/0054711 A1 Feb. 22, 2018

Related U.S. Application Data

(63) Continuation of application No. 15/422,223, filed on Feb. 1, 2017, now Pat. No. 9,813,874.

(60) Provisional application No. 62/290,764, filed on Feb. 3, 2016.

(51) Int. Cl.
*H04W 4/029* (2018.01)
*H04W 52/02* (2009.01)

(52) U.S. Cl.
CPC ....... *H04W 4/029* (2018.02); *H04W 52/0261* (2013.01); *Y02D 70/00* (2018.01); *Y02D 70/1224* (2018.01); *Y02D 70/1262* (2018.01); *Y02D 70/142* (2018.01); *Y02D 70/144* (2018.01); *Y02D 70/164* (2018.01)

(58) Field of Classification Search
CPC ........... H04W 4/12; H04W 4/21; H04W 4/02; H04W 4/18; H04W 4/20
See application file for complete search history.

(56) References Cited

U.S. PATENT DOCUMENTS

| | | | |
|---|---|---|---|
| 9,813,874 B2 * | 11/2017 | Gordon | H04W 4/029 |
| 2006/0022815 A1 * | 2/2006 | Fischer | G06K 7/0008 340/505 |
| 2009/0164120 A1 | 6/2009 | Boore | |
| 2013/0191908 A1 | 7/2013 | Klein | |
| 2013/0322488 A1 | 12/2013 | Yazami et al. | |
| 2013/0324196 A1 | 12/2013 | Wang | |

(Continued)

OTHER PUBLICATIONS

ISR and Written Opinion of ISA for PCT/US2017/016070 (dated Apr. 25, 2017).

*Primary Examiner* — Diane D Mizrahi
(74) *Attorney, Agent, or Firm* — Koffsky Schwalb LLC; Mark I. Koffsky

(57) ABSTRACT

A mobile application tracks a user's behavior and activities and, in particular, a geo-location. The mobile application may then produce a profile of the user's behaviors and locations. This may be used to optimize mobile device power and may also be used as a data aggregator to collect and gather user information for other purposes, such as data marketing and modeling. In an embodiment, the mobile application is continuously monitoring the mobile device's battery level and power usage and determining the most power-efficient approach for tracking the device's location. One-hundred percent location accuracy is not always required when profiling a user's behavior. It may be more critical to simply determine the general location of the device and the associated user. The application may continuously function in the background while expending the least amount of power possible.

20 Claims, 4 Drawing Sheets

(56) References Cited

U.S. PATENT DOCUMENTS

2014/0045537 A1  2/2014  Luther et al.
2014/0096215 A1  4/2014  Hessler
2014/0282877 A1  9/2014  Mahaffey
2014/0331060 A1  11/2014 Hayton
2015/0033305 A1  1/2015  Shear

* cited by examiner

SYSTEM AND METHOD FOR MAXIMIZING MOBILE DEVICE POWER USING INTELLIGENT ATTRIBUTE SELECTION

CROSS-REFERENCE TO RELATED APPLICATIONS

This application is a continuation of U.S. patent application Ser. No. 15/422,223, filed Feb. 1, 2017, which claims priority to U.S. Provisional Application Ser. No. 62/290,764 filed on Feb. 3, 2016, all of which are hereby incorporated by reference in their entirety.

FIELD OF DISCLOSURE

The present disclosure is directed to systems, methods, and devices for dynamically determining and enhancing the energy usage of mobile devices by determining a mobile device's location based on a series of sensor input and behavior modeling. More specifically, the systems, methods, and devices are directed to a mobile application or an operating system feature of a mobile device that enhances, extends, and maximizes the battery life of the mobile device by dynamically determining and using the most energy efficient method for determining the mobile device's location based on an input and modeling.

BACKGROUND

Mobile technology continues to expand and continues to become more important to our everyday lives. As a result of mobile communications, a user and/or their mobile device may need to be able to accurately identify the device's geo-location. Mobile devices are equipped with a variety of sensors and measuring devices and are often in communication with external sensors or applications, providing different ways to find a user's location. The most straightforward and accurate way to find one's location is to use a Global Positioning System (GPS) sensor in the device. The sensor receives signals from a series of low earth orbit geosynchronous satellites and finds where that device is located on the globe. Using a GPS receiver in a mobile device has a power expense that is often very high, especially with the limited power resources of a mobile device.

A second approach to positioning allows mobile devices to constantly report back to a system or server, all the Wi-Fi Service Set Identifiers (SSIDs) that the mobile device may encounter at a specific location. The location information where those SSIDs are located may have been previously acquired from GPS signals, and that information is stored in a database which identifies the Wi-Fi SSID environment at given locations around the globe. Using a matching algorithm the mobile device can match the device's location to the actual location that has been previously recorded. This approach assumes that the mobile device is also at that location because of the match in SSIDs. Wi-Fi signals allow the mobile device to generally locate its position, and then by accessing the historic database information, the device can make a good estimation of where it is located based on the sensed Wi-Fi SSIDs. Wi-Fi position location requires less power than GPS because it only has to monitor the Wi-Fi signals it receives.

A third approach for geo-location for a mobile device, which is less accurate but has even lower power consumption than Wi-Fi, is cellular signal identification/triangulation. Cellular signal identification/triangulation allows the mobile device to identify the cell tower signals it is receiving at any given time and then query a database to determine a general location fitting the criteria where those particular towers would be located. As will be appreciated by those skilled in the art, other methods of geo-location are available, such as the use of BlueTooth™, iBeacons, and others, each with its own power consumption requirements.

Each of these geo-location methods initially use coarse-grained location algorithms to speed up the search by reducing search space. For example, IP addresses assigned by network providers may indicate coarse geographic regions, which may be used as a low or zero energy location sensor. In this manner, the device has a broad geographic region to begin its location identification.

Each of these methods have advantages and limitations. More accuracy usually requires more power, but accuracy is not always the most important criteria. Conversely, lower power usage implies less accuracy and may not always be sufficient for a given application. Accordingly, a need exists for a way to minimize sensor usage to optimize power usage while ensuring sufficient accuracy based on the application.

SUMMARY

In the embodiments described herein, a mobile application tracks a user's behavior and activities and, in particular, a geo-location. The mobile application may then produce a profile of the user's behaviors and locations. This may be used to optimize mobile device power and may also be used as a data aggregator to collect and gather user information for other purposes, such as data marketing and modeling. In an embodiment, the mobile application is continuously monitoring the mobile device's battery level and power usage and determining the most power-efficient approach for tracking the device's location. One-hundred percent location accuracy is not always required when profiling a user's behavior. It may be more critical to simply determine the general location of the device and the associated user. In one embodiment, the application may continuously function in the background while expending the least amount of power possible.

To achieve the desired power saving and location tracking, the application executes various algorithms utilizing internal sensor data and determines which method or component of the mobile device should be activated to determine the device's location. Further, the application must determine how often the sensors of the device should be activated to sufficiently determine the device's location. The application seeks to determine, within a reasonable degree of location accuracy, using the selected input components and available data points, an effective location sampling-rate. Utilizing an estimate of location may be based on inputs including the quality of the input component used (e.g., Wi-Fi, GPS, tower signal identification/triangulation, BlueTooth, iBeacons, or any electromagnetic signal environment, that may comprise Wi-Fi, Bluetooth, iBeacons, etc.), the rate of displacement of the device since the last measurement, external sensor data, on board applications, previous location measurements, previous behavior, and others.

An optimal location sampling-rate may be determined by balancing a predicted rate of location-sampling against a decaying rate of location quality over time. The decay rate of the location quality is a recognized drop in the quality of the calculation of the device's location from when the location was previously determined and may be based on inputs, including confidence scores for the best guess of the device's location, the rate of displacement (speed) of the device determined using the device's sensors or incoming location data, and others. In an embodiment, a Kalman type model was used. The model comprises a series of internal states (i.e., location and accuracy) and observations (i.e., behavior/location measurements), and a basic model for how observations translate or apply to the internal states.

The application can extrapolate information about a user's activities based on the information provided, and create a model based on that behavior. For example, the application can determine that the mobile device is traveling on a particular type of vehicle, such as a train, when the device is moving at a particular speed and the location of the device. The estimate of the user location, the decay rate, the user's activities and behaviors, and the optimal sampling rate may be used as inputs, among others, to determine which mobile device component to activate to determine the location of the mobile device at any given time.

By determining a user's likely modality and the estimated speed based on behavior modeling, the system or device can determine the best method for determining the device's location and how often that information needs to be updated to provide an accurate location and an efficient use of power. For example, a mobile device that is in a vehicle traveling 35 miles per hour through a populated area needs to update more frequently than a mobile device being used by a user that is walking at 4 miles per hour through the same area. While both may be able to update using Wi-Fi signals, which provides sufficient accuracy for that application, the device in the vehicle will need to be updated much more frequently because changes between each sample occur much more quickly. In between samples, as the device's location accuracy decays with each sample, at some point, it will exceed a predetermined threshold value which requires the device to expend power to gain accuracy. The threshold may be triggered based on how accurate the device's internal estimate is versus where it actually is located.

In one embodiment, a method for reducing power consumption on a mobile device comprises obtaining, by a mobile device, location information from a positioning module of the mobile device that identifies a first position of the mobile device; obtaining, by the mobile device, sensor data from a sensor in the mobile device; modeling, by the mobile device, a behavior based on the obtained sensor data; computing, by the mobile device, a rate of decay of the first position; selecting, by the mobile device, a first threshold level, based on a desired level of accuracy (defined by the application), for requesting a location update from the positioning module of the mobile device; estimating, by the mobile device, a total decay from the first position; upon estimating that the total decay from the first position exceeds the first threshold level, obtaining, by the mobile device, a second position from the positioning module in the mobile device, wherein the positioning module has a plurality of location modes for obtaining location information and each location mode uses a different level of power consumption to obtain the location information; and selecting, by the mobile device, a location mode with a lowest level of power consumption to obtain the second position with sufficient accuracy.

In another embodiment, a method for reducing power consumption on a mobile device comprises receiving, at a modeling server, first location information from a mobile device with a positioning module and a sensor; receiving, by the modeling server, sensor data from a sensor of the mobile device; modeling, by the modeling server, a behavior based on the received sensor data; computing, by the modeling server, a rate of location decay of the first location information; selecting, by an application on the modeling server, a first threshold level based on the modeling for requesting a location update from the positioning module of the mobile device; estimating, by the modeling server, a total location decay from the first location; upon estimating that the total location decay from the first location exceeds the first threshold level, requesting, by the modeling server, second location information from the positioning module of the mobile device, wherein the request for second location information includes an instruction to the mobile device to use one of a plurality of location modes for obtaining the second location information; and wherein each location mode requires a different level of power consumption to obtain the second location information.

In another embodiment, a mobile device comprises a memory; and a processor used for reducing power consumption on the mobile device configured to obtain location information from a positioning module of the mobile device that identifies a first position of the mobile device; obtain sensor data from a sensor in the mobile device; model a behavior based on the obtained sensor data; compute a rate of decay of the first position; select a first threshold level, for requesting a location update from the positioning module of the mobile device; estimate a total decay from the first position; upon estimating that the total decay from the first position exceeds the first threshold level, obtain a second position from the positioning module in the mobile device, wherein the positioning module has a plurality of location modes for obtaining location information and each location mode uses a different level of power consumption to obtain the location information; and select a location mode with a lowest level of power consumption to obtain the second position.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner.

Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

Figure 1:
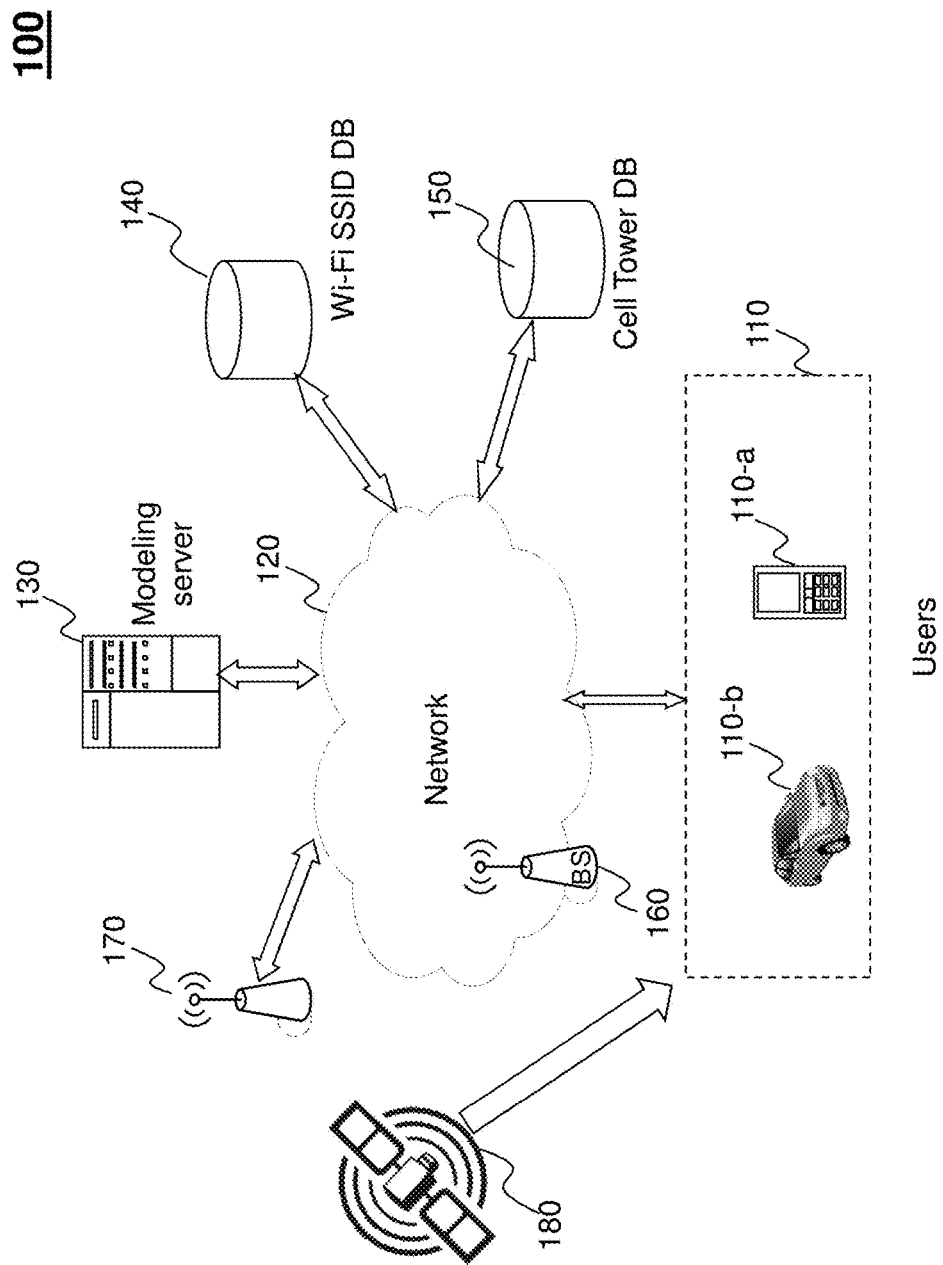
FIG. 1 shows a schematic view of an example embodiment of a computer network diagram according to the present disclosure.

FIG. 1 is an architecture of an exemplary system 100. System 100 includes user devices 110a-110n, a network 120, a modeling server 130, a Wi-Fi SSID database 140, a cell tower database 150, cell towers 160, wireless access points 170, such as Wi-Fi, and GPS satellites 180. Network 120 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 160, through which a user 110 may connect to the network in order to receive location information via the network.

Users' devices 110 are connected to the network and may be of different types, such as a handheld mobile device 110-a or a device 110 in a motor vehicle 110-b. Modeling server 130, which may be implemented in hardware or software, may comprise models analyzing user's behavior and history as well as modeling parameters. For example, in an embodiment, modeling server 130 may store a user's or a sample of user's historical data indicating user behaviors or activities, such as when a user is walking, when a user is driving, when a user is riding on a train or a bus. The models in modeling server 130 may be accessed by a user's mobile device 110 and/or may be pushed to a user's device 110 to calculate mobility and behavior, when the application or operating system requires. Alternatively, the models may be stored on the user device, and the model parameters may be stored on the sever 130.

Wi-Fi SSID Database 140 is coupled to the network 120 and stores Wi-Fi SSID data. A user device when estimating location based on Wi-Fi signal may use the SSID's viewable to the user's device 110 to approximate location by accessing the database 140 to coordinate location based on the received Wi-Fi SSID signals.

Cell tower database 150 is coupled to network 120 and comprises lookup tables for cell tower locations. When a user's device 110 is using tower triangulation for location, it may process the incoming cell tower signals and triangulate its position based on delay and signal strength. Alternatively, the device 110 may access database 150 and use a look up table algorithm to determine its possible location based on the cell towers signals it receives.

Cell tower 160 may be coupled to a wireless base station coupled to a cellular network or to another network. Cell tower 160 is coupled to network 120 and allows user device 110 to communicate with network 120 when required. Cell tower 160 may also convey its location information directly to user device 110 to aid with signal identification/triangulation. Wireless access points 170 may be a wireless router, modem, short range transceiver, or some other wireless access point. Wireless access point 170 may provide a Wi-Fi signal, Bluetooth signal or iBeacon signal or some other form of short range communications interface signal. Wireless access point 170 may communicate location information and its SSID to user device 110 which may be used to calculate a user's position. Satellite 180 is a GPS satellite and transmits global positioning information to user device 110. It is also noted that a network IP address received by the device over network 120 may be used as a low power coarse location identifier.

In the exemplary system 100, a user with device 110 may initially turn on a device 110 inside a building and receive a set of Wi-Fi signals from wireless access point 170. The Wi-Fi SSID's for the set of wireless access points 170 may be conveyed to database 140 via a Wi-Fi or cellular signal and are compared to a look up table to determine where that specific set of SSID's exists. Based on that information, the user's initial location may be estimated by the mobile device or the system. Next, as the user leaves the building and enters an automobile, sensors within the device 110 may sense a change in motion, acceleration, or magnetic field, and send a request to modeling server 130 to predict where the user's device 110 is located and what mode of motion is involved. Modeling sever 130 may interpret the sensor data as indicating that the user is travelling in a car and convey that information back to the user's device 110. Additionally and/or alternatively, the modeling data is pushed to the user's device 110 based on the sensor data and the user device 110 determines the user's probabilistic behavior based on the modeling. Initially, the system will rely on the user's last known location data as a starting point and attempt to predict any change based on the modeling. As the quality of that modeling estimation data decays, the user device 110 will need, at some point in time, to update the location data using the same or different geo-location devices and methods.

For example, if the modeling server 130 determines that the user is in a car moving at a high rate of speed, the modeling server 130 can estimate how fast the accuracy of the location data and/or the user activity data will decay to a point of obsolescence based on the modeled behavior. At which point, the last location information is no longer considered a good indicator of the user's or device's 110 location. For example, a device 110 associated with a user who is determined to be walking, according to one or more activity models, may need to only update location data every, e.g., 30 seconds, because the potential for error every second is small due to the low rate of change in location. Contrastingly, a user device 110 associated with a user who is determined to be moving in a car or train at 60 miles per hour (MPH) according to one or more activity models, will have a comparatively larger change in location every second and the quality of the estimated location will decay comparatively faster than walking at 3 MPH.

Once the estimated location data decays to an unacceptable level based on the modeling estimation, a new location measurement must be performed. The new measurement may be based on the source of data available, i.e., GPS, Wi-Fi, Bluetooth, iBeacon, or cellular, the accuracy required and the power cost associated with each source and the necessary accuracy. For example, in an embodiment, if the model probability indicates that the user is walking with the user device 110, it may be acceptable to use cellular tower information which uses low power consumption. However, cellular tower information may not always be available, e.g., walking in the woods or in a remote location, accordingly, the system must then determine the next most "cost effective" means to obtain the accuracy required. If the original power location solution is available, the system will update the location based on that solution. If not, the location accuracy information based on the last update will continue to decay based on the modeled behavior until it reaches a point, e.g., the next threshold, where the system determines that it is willing to expend a little more power to obtain new location information. At this next threshold, the system will again attempt to obtain location information from the location modality that requires the lowest power, e.g., Wi-Fi or GPS. Again, if the preferred signal is available, an update will be provided. If the preferred signal is not available, the location accuracy may continue to decay until the next threshold and its associated location information source. It will be understood, that at some point, the system may be required to use a GPS signal or some other higher power location mode even if such accuracy is not necessarily required based on the predicted model. It will be further understood, that during the entire process, the system will be continuously monitoring the available sensor data to determine if the modality model needs to be updated or changed. For example, if the user model probability suddenly indicates that the user is no longer driving, the system thresholds and acceptable power consumption for location information will need to be revised.

In an embodiment, each location sensor is assigned a threshold proportionate to the inverse of the accuracy of location measurements delivered by the sensor:

$$\text{threshold(sensor)} \propto \text{constant} * 1/\text{accuracy}$$

As will be understood, a location sensor with lower accuracy that requires a higher energy cost than other available sensors will not be designed into a device. It will not "survive" the initial device design as another more accurate power efficient device will supplant the inferior sensor and it will not be implemented. Accordingly, the order of thresholds (from lowest to highest) will be monotonically increasing in terms of energy cost, and monotonically decreasing in terms of accuracy, i.e., the lowest threshold in terms of accuracy decay will rely on the sensor with the lowest energy consumption and the lowest accuracy. When a threshold is triggered, a specific sensor that fits the required criteria should be used, if available.

It will be understood, that the sensor data may be continuously monitored to provide accurate modeling data. It will further be understood, that data from a plurality of sensors may be filtered together to provide the most accurate information, while at the same time provide for the fusion and filtering of individual sensor data points that may be incorrect or of low accuracy.

It is further understood, that the modeling used to predict the user's behavior may be based on activity recognition. Activity recognition recognizes the actions and goals of one or more users from a series of observations of the user's actions and the environmental conditions over a period of time. The information may be provided by a series of sensors, such as those associated with a user's mobile device 110. Sensor-based activity recognition may integrate the mobile's sensor data and data mining and machine learning techniques to model the human activities. Mobile user device 110 provides sensor data to enable physical activity recognition In an example, known sensor data may be segmented into a series of smaller portions to identify characteristics associated with a given user behavior. Once these segments and behaviors have been identified, a timeline of segments of behaviors may be created that is parallel to the stream of sensor data. Instead of a continuous data stream, however, the sensor signals are discreet and each is associated with a known behavior. In this manner, a timeline of behaviors, i.e., walking, sitting, jumping, running, can be quantified into a series of specific data points. Once these data streams have been previously quantified they may be used as a baseline against actual user behaviors to not only identify a specific behavior, but to eliminate a bad data point which may point to a completely different behavior. For example, if 90% of the behavior data points indicate that a user is running and 10% intermittently indicate that the behavior is driving while overall estimated or measured speed does not change, it's much more likely that the user is running and not driving. Further, by combining that information with other known data, such as location, erroneous behaviors may be eliminated from the model.

In an embodiment, the system or application uses multiple different quality thresholds based on the potential rate of decay of the data and the modeling behavior. For example, if the modeling server 130 determines that the user is walking, the modeling server 130 may then estimate that the acceptable decay before taking another sample is 100 feet. If the measurement accuracy decays at 5 feet/second, the system determines that within 20 seconds, the user's location may have changed by some interval greater or less than 100 feet and then the modeling server 130 requires the device 110 to obtain another location measurement using, for example, tower triangulation/identification, which requires less power consumption than GPS or Wi-Fi. The more energy-efficient use of tower signal identification/triangulation may be used because the rate of change in location during the activity of walking is small enough, and accuracy is not as critical as it might be for other activities, such as driving. If a cellular signal is available, the device 110 will use cellular signal for triangulation/lookup identification. If no cellular signal is available, the location data may continue to decay and will reach the second threshold, which may require Wi-Fi SSID location identification at 150 feet decay. If a Wi-Fi measurement is available, it may use that measurement. If not, then the signal will decay until the next threshold, e.g., at 200 feet, which will then resort to a GPS signal which requires the most power to be expended. It is to be understood that the thresholds may be set differently based on the modeling and the activity actually being performed. For example, a user that is walking may not need as much accuracy as a device traveling in a car at 60 MPH on a highway. Based on this difference in accuracy requirements, the tradeoff on power consumption can be maximized and optimized based on modeling data rather than a rigid set of instructions. The system may be willing to sacrifice accuracy for power when the situation warrants such a tradeoff, but when accuracy is required, then it may be willing to expend power resources more frequently.

It is to be understood, that based on the modeling and estimated decay rate, location updates need not always proceed from lowest power requirement to highest. For example, if a device is traveling at such a high speed, the modeled decay between intervals can be so great that the most accurate location may be needed, and the lower power options may not be viable because they do not provide the accuracy required for the situation.

In an embodiment, the models from model server 130 are located on the device 110 and the model parameters are stored on sever 130. The model parameters can be pushed to the device 110 when server 130 is queried by the application or may be resident on the user device 110. The model parameters may be updated, e.g., on a periodic basis, based on historical user information. As more historical data becomes available, the more information can be used to train the model. In an embodiment, model execution may be performed on the device 110 even when the device 110 does not have a connection to network 120. In an embodiment, the interval between automatic refreshes can be based on the behavioral information that is determined using the model.

In an embodiment, the rate of decay can be estimated based on a known speed for a particular model or on actual calculated speed. Speed may be obtained directly from a sensor, such as a received GPS signal, or it may be obtained by filtering a set of sensor data from a variety of sources. In an embodiment, a Kalman filter can filter the set of sensor data, although other filter techniques can be used. Kalman filtering uses a series of measurements observed over time, containing statistical noise and other inaccuracies, and produces estimates of unknown variables that tend to be more precise than those based on a single measurement alone. In an embodiment, the Kalman model comprises a series of internal states (i.e., location and accuracy) and observations (i.e., behavior/location measurements), and a model for how observations translate or apply to the internal states.

The Kalman filter works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. The algorithm is recursive. It can run in real time, using only the present input measurements and the previously calculated state and its uncertainty matrix; no additional past information is required.

In addition to or as an alternative to determining speed estimations, in some embodiments, the system may determine a physical modality by which the device is moving in order to identify the rate of decay. This is based on modeling the device's behavior and determining the probability of one modality versus another and modeling based on the modality with the greatest probability. In an embodiment, modeling may be based on inertial measurement unit data obtained from the mobile device. Inertial measurement units such as accelerometers may be used to predict behavior once a sufficient amount of data is collected and analyzed. Utilizing machine learning and behavioral analysis such as activity recognition to analyze the inertial measurement unit data, the system may distinguish, based on a history of signals, the model for the specific behavioral patterns like walking, running, and driving, from other types of behavior.

Based on the inertial measurement unit data alone the system may have an indication of how the user's device is moving (e.g., speed, changing location, pressure). This data can be used to distinguish between different actions, such as riding in a vehicle, riding a bicycle, walking, sitting, standing, and other modalities as long as the type of behavior or activity that the user is doing is physically different from other types. For example, it is possible to distinguish between driving a car, driving a bus, riding in a subway, riding a bicycle, walking, running, or sitting, using a series of sensor data. It may not be possible, however, to distinguish between riding in a taxi and driving a car.

Accordingly, based on both the model as well as the physical location, an accurate estimate of how fast the data decays over time can be estimated. That estimation may be used to set thresholds on that decay and determine how much power the system is willing to expend to get a new location update reading. As a result, the system uses the modeling, the thresholds, and the estimations to provide the user's device with a way to fuse location and movement information into the best estimate of where the device is located at any given time while conserving power. The system or application on the user's device can then determine which location information and device sensor needs to be used and allows the device, in an extremely efficient and low power fashion to obtain its location, as compared to traditional approaches that rely on GPS signals all the time.

Figure 2:
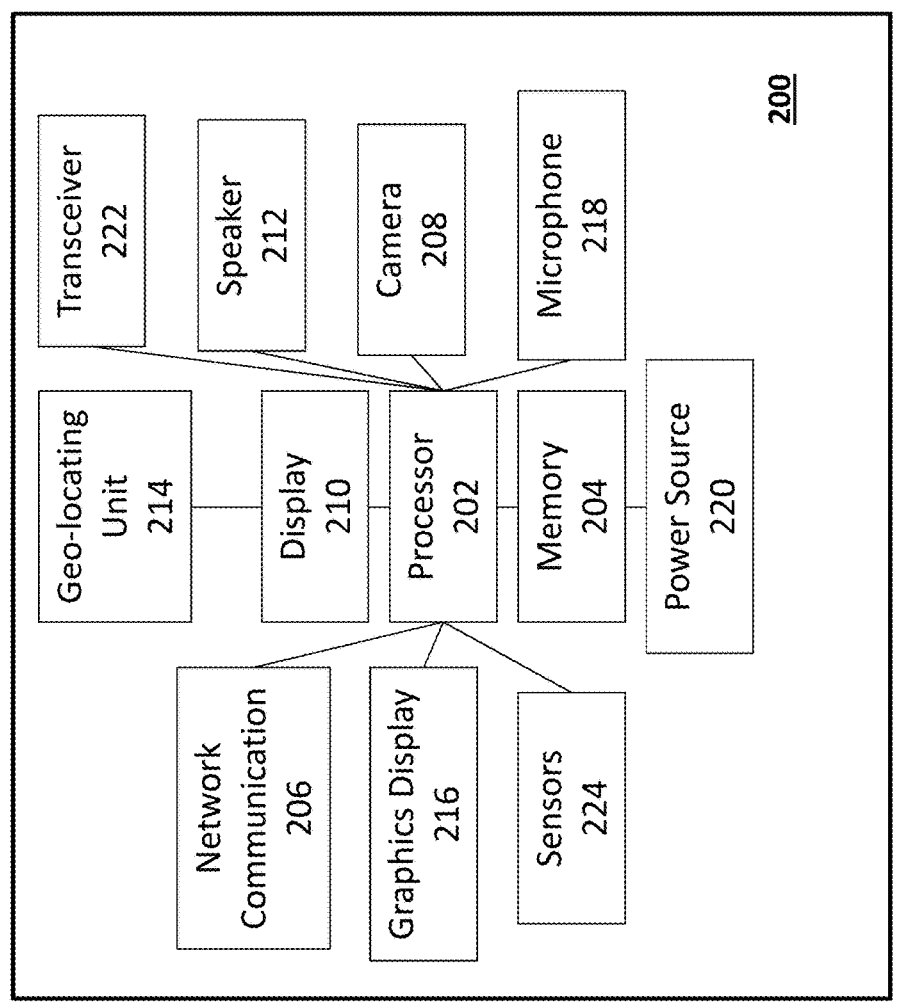
FIG. 2 shows a schematic view of an example embodiment of a computer according to the present disclosure.

FIG. 2 shows a schematic view of an example embodiment of a mobile computing devise according to the present disclosure. A mobile computing device 200 comprises a processor 202, a memory 204 operably coupled to the processor 202, a network communication unit 206 operably coupled to the processor 202, a camera 208 operably coupled to the processor 202, a display 210 operably coupled to the processor 202, a speaker 212 operably coupled to the processor 202, a geo-locating unit 214 operably coupled to the processor 202, a graphics unit 216 operably coupled to the processor 202, a microphone 218 operably coupled to the processor 202, a transceiver 222 operably coupled to the processor 202, and a sensor 224 operably coupled to the processor 202. The mobile computing device 200 comprises a power source 220, which powers the processor 202, the memory 204, the network communication unit 206, the camera 208, the display 210, the speaker 212, the geo-locating unit 214, the graphics unit 216, the microphone 218, the transceiver 222 and the sensors 224. In an embodiment, the mobile computing device 200 may include more components or less components and at least one of the network communication unit 206, the camera 208, the display 210, the speaker 212, the geo-locating unit 214, the graphics unit 216, the microphone 218, the transceiver 222 and the sensors 224.

Mobile computing device 200 may be a mobile phone, a laptop computer or a tablet, or any other mobile computing device. The processor 202 comprises a hardware processor, such as a multicore processor. For example, the processor 202 comprises a central processing unit (CPU).

The memory 204 comprises a computer-readable storage medium, which can be non-transitory. The medium stores a plurality of computer-readable instructions, such as a software application, for execution via the processor 202. The instructions instruct the processor 202 to facilitate performance of a method for video-based commerce, as described herein. Some examples of the memory 204 comprise a volatile memory unit, such as random access memory (RAM), or a non-volatile memory unit, such as a read only memory (ROM). For example, the memory 204 comprises flash memory. The memory 204 is in wired communication with the processor 202. Also, for example, the memory 202 stores a plurality of computer-readable instructions, such as a plurality of instruction sets, for operating at least one of the network communication unit 206, the camera 208, the display 210, the speaker 212, the geo-locating unit 214, the graphics unit 216, and the microphone 218.

The network communication unit 206 comprises a network interface controller for computer network communication, whether wired or wireless, direct or indirect. For example, the network communication unit 206 comprises hardware for computer networking communication based on at least one standard selected from a set of Institute of Electrical and Electronics Engineers (IEEE) 802 standards, such as an IEEE 802.11 standard. For instance, the network communication unit 206 comprises a wireless network card operative according to a IEEE 802.11(g) standard. The network communication unit 206 is in wired communication with the processor 202.

The camera 208 comprises a lens for image capturing, such as a photo or a video. The speaker 212 comprises a loudspeaker, such as an electroacoustic transducer providing sound responsive to an electrical audio signal input.

The display 210 comprises an area for displaying visual and/or tactile information. The display 210 comprises at least one of an electronic visual display, a flat panel display, a liquid crystal display (LCD), and a volumetric display. For example, the display 210 comprises a touch-enabled computer monitor. The display 210 is in wired communication with the processor 202. The display 210 can also be remotely coupled to the processor 202, such as wirelessly.

The geo-locating unit 214 may comprises a GPS receiver, a Wi-Fi receiver, and a cellular receiver. It is understood that the Wi-Fi and GSM or cellular receiver used for geo-location may be the same hardware/transceiver components used for network communication. They need not be separate devices used only for geo-location purposes. The geo-locating unit 214 is in communication with the processor 202. Note that other types of geo-location are possible, such as via cell site signal identification/triangulation. The geo-locating unit 214 can also be remotely coupled to the processor 202, such as wirelessly. In n embodiment, the geo-locating unit comprises a GPS receiver, a short range communications receiver, and a cellular or wireless telephony receiver. The frequency ranges of the geo locating unit 214 may vary and are dependent on the various technologies, i.e., TDMA, CDMA, GSM, 3G, 4G, LTE, GPRS and others The graphics unit 216 comprises a graphics processing unit (GPU) for image processing. The graphics unit 216 is a graphics dedicated unit, but in other embodiments, the processor 202 is integrated with the graphics unit 216. For example, the graphics unit 216 comprises a video card. The graphics unit 216 is in wired communication with the processing unit 102.

The transceiver 222 comprises a transmitter and a receiver. It may be a single unit with a multiplexer or may be separate units. It may comprise low noise amplifiers, RF/IF filters, and other components. It may be capable of receiving any signals in the electromagnetic spectrum, including Wi-Fi signals, Bluetooth, RF signals, IF signals and any other form of wireless communication signals.

The sensors 224 comprises a single sensor or a series of sensors. It may include internal sensors but may also include a remote sensor interface that receives sensor data from a remote sensor that is then supplied to the mobile device. Potential sensors include but are not limited to inertial measurement units, accelerometers, barometers, temperature sensor, light sensors, altimeters, and magnetic sensors.

The power source 220 powers the mobile computing device 200. The power source 220 comprises at least one of an onboard rechargeable battery, such as a lithium-ion battery. Mobile computing device 200 can be operably coupled to at least one input device, such as a keyboard or other suitable input devices. Mobile computing device 200 can also be coupled to at least one output device, such as a printer, a projector, or other suitable output devices. In an embodiment, mobile computing device 200 is the user's device 110. As will be understood power source 220 of mobile computing device 200 stores limited power for the operation of the mobile computing device 200. In an embodiment of the present disclosure, the amount of power expended by power source 220 for obtaining location information is reduced and the usable time of power source 220 before requiring recharging is maximized using the described application.

Figure 3:
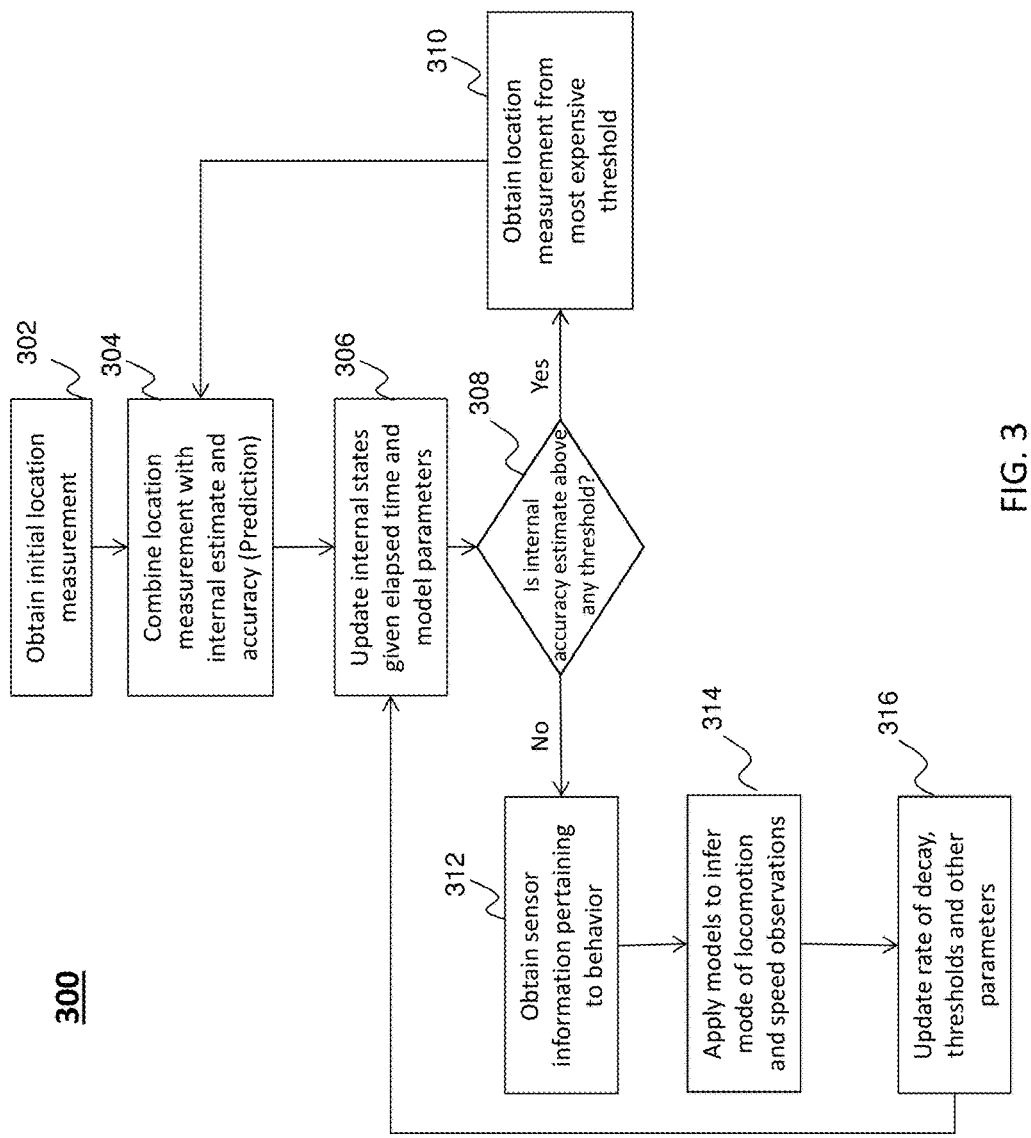
FIG. 3 depicts a flow diagram illustrating the steps of the described method and system in accordance with an embodiment of the present disclosure.

FIG. 3 depicts a flow diagram of the present embodiment of system 300. Prior to step 302, an application, client, or operating system is installed on a mobile deice 110. The application or client may be obtained from a third party app store such as Google® Play of Apple iTunes® or may be downloaded to the mobile device directly from a web site. Alternatively, the application may come pre-loaded on mobile device 110. The application on mobile device 110 may be always active whenever location information is requested, or it may be called in the background whenever another application requests location data. At step 302, the device may use the application for primary navigation or an application that requires location data may request the device's current location. Assuming the device is stationary, the system may use the last location data available or may request a new update based on the signals available. If the device is indoors, GPS may not be available. Signal identification/triangulation of cellular signals or Wi-Fi SSID may be available and are usually sufficiently accurate.

This last update may be sufficient as long as there is no change to the device indicating a change in position, method of mobility, or location. At step 304, the system combines the last location measurement with a device internal estimate and accuracy prediction. The internal accuracy may be obtained from sensor data located in the device as well as other inputs, such as other application data. For example, the device's inertial measurement unit or accelerometer may indicate a drastic change in inertial movement when the device first enters a car, train, or bus that starts to move. Additional sensors, such as a magnetometer may indicate that the device is within a large metallic object, such as a train. Frequent stops and starts may indicate the type of vehicle, such as a bus that stops often as opposed to a car which may stop less frequently. Additionally and/or alternatively, other applications running on the mobile device may provide an indication as to the user's activities. For example, a user's calendar indicating that a user is going for a run or a boat trip may be used to aid in identifying the indicated change in models. Similarly, if the device invokes a running or biking application, the system may use that information to aid in determining the change to the device.

Once a change is indicated, the device using the modeling based on the sensor data at step 306 updates the internal status given the elapsed time since the last location update and the model parameters and determines if the modeled parameters are above a threshold generated based on the model. The model, may be based on the specific user's behavior as well as other analyzed user's behavior. The model may be used to obtain a probability about what type of activity the user and the device are engaged in. Once the activity is identified with a high degree of probability, the data is input to the model to confirm the modeled activity. Based on the modeling, the model parameters, such as speed may be used to generate the parameters for location updates and power management.

In an embodiment, signals forming the actual behavior are inputted recursively into various models to determine a probability that the behavior is likely to be one of the expected behaviors. For example, if the model parameters are inputted into the model and modeled against various behaviors (e.g., being in a car, running down the street, sitting, riding or driving a bus, riding a bicycle), the system will estimate a probability distribution over all of these scenarios as possible types of behaviors. These model parameters/data may be used to train and improve the system and teach it how to differentiate the modeled assumptions based on which model is closest, because the closest model will have a higher probability in the posterior distribution.

At step 308 the system determines if the accuracy estimate is above the predetermined threshold. If it is above the thresholds, them at step 310, the device obtains a new location measurement using the method with the lowest power consumption acceptable for that associated threshold, if available.

If the internal accuracy at step 308 is not above the threshold, then at step 312, the device and/or system obtains sensor behavior pertaining to the modeled behavior. At step 314, the modeled behavior is applied to infer the mode of locomotion and the speed observations and at step 316, based on the inferred mode, the rate of decay, the thresholds and other parameters are updated. In an embodiment, the refresh rates, thresholds and modeled decay rates are proportional to the modeled rate of speed. For example, if the modeled behavior indicates a high rate of speed, then the decay rates will be fast, the thresholds will be low, and the refresh rates will be high. Contrastingly, if the model indicates slow speeds, such as walking, the decay rates will be slow, the thresholds will be high, and the refresh rate will be low. As will be understood in the art, these factors directly impact which mode of geo-location to employ and how much power to expend. While the lowest power cost mode is always desirable, based on the changing criteria it is not always possible, even if available.

It is to be understood that decay rate refers to the rate at which the last location data accuracy decays over time. The interval is simply when the decay is computed. The decay itself is continuous. For example, if a GPS measurement is taken every second using GPS, which has about a 6 meter accuracy, that measurement will change as a function of the modeled speed every second based on the modeled behavior. Accordingly, for each second that an update is not received, the user and the user's device 110 may have moved proportionately based on the user's speed. If it is estimated that the user is moving very fast, the rate of decay is very high, and the last estimate accuracy decays by several hundred meters in a matter of second.

Decay threshold is the level of error that the system can tolerate based on the modeled behavior before requesting a new update. There are different thresholds for each geo-location mode. For example, the system may be willing to expend a limited amount of power by using cell tower identification/triangulation if the error reaches +/−100 meters and more power if the system decay is greater. For example, the threshold for utilizing Wi-Fi SSID may be 200 meters and the threshold for GPS may be 300 meters. These threshold values may be predetermined for each geo-location mode and may vary based on the modeled behavior. It is to be understood that these errors and threshold values are for illustrative purposes only and other values and thresholds and rates of decay can be used and will vary based on the modeling, mode of motion and environment. In an embodiment, as each of these thresholds is reached, the system will attempt to obtain a new geo-location measurement by the designated means if available.

The refresh rate indicates a period of time when a measurement may be taken based on time, regardless of decay. In an embodiment, when the refresh rate indicates that it is time for an update regardless of the threshold value, the mobile device 110 will attempt to expend the least amount of energy by using the location mode with the lowest energy cost acceptable for the modeled behavior if the signals are available.

Returning to FIG. 3, once the rate of decay, the thresholds, and any other required parameters are updated, the device or system returns to step 306 to update the internal states based on the elapsed time and new modeled parameters. It should be noted, that at step 310, if location signals are not available, such as in the case of no cell tower coverage for example, then at step 304 the system will continue to allow the measurement accuracy to decay until the next threshold is reached. If at step 308, the threshold for the mode with the next highest power consumption is reached, and the signal is available, then at step 310 the newest location update will be obtained. As will be understood, by one skilled in the art, ultimately, the system may rely on the location signal with the highest power consumption because it is the only signal available or because the high rate of modeled speed indicates that such an expenditure of energy is required.

Figure 4:
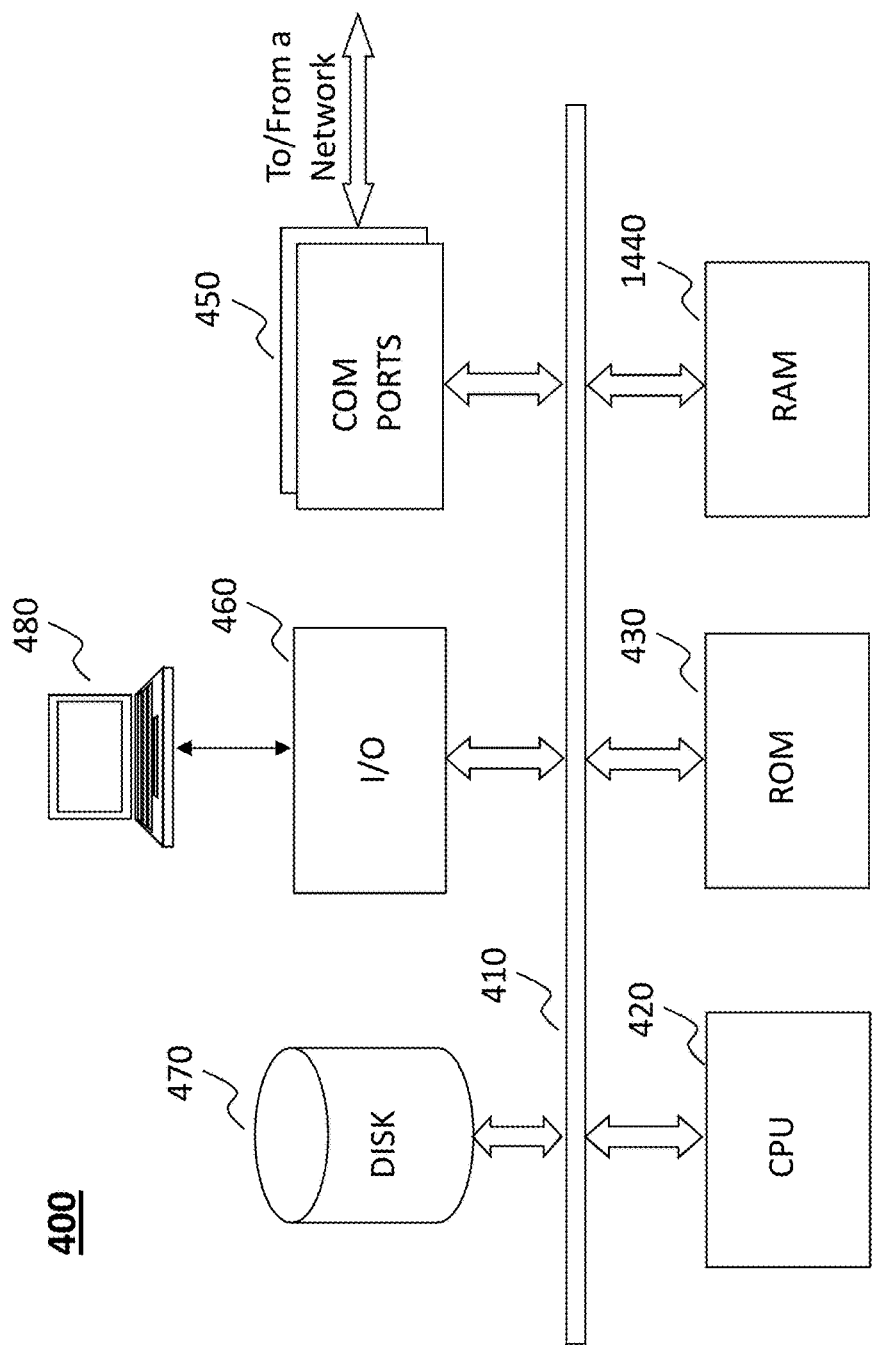
FIG. 4 depicts a general computer architecture on which the present teaching can be implemented.

FIG. 4 depicts a general computer architecture, such as that found within a server or mobile device on which the present teaching can be implemented and has a functional block diagram illustration of a hardware platform which includes user interface elements. The computer may be a general purpose computer or a special purpose computer. This computer 400 can be used to implement any components of the system and method for maximizing mobile device power using intelligent geo-location selection as described herein. For example, the modeling server 130 that models the behavior or the mobile device 110 or the Wi-Fi SSID database 140 that houses the look up tables for Wi-Fi location, can all be implemented on a computer such as computer 400, via its hardware, software program, firmware, or a combination thereof. Although only one such computer is shown, for convenience, the computer functions relating to the maximization of mobile device power may be implemented in a distributed fashion on a number of similar platforms, to distribute the processing load.

The computer 400, for example, includes COM ports 450 connected to and from a network connected thereto to facilitate data communications. The computer 400 also includes a central processing unit (CPU) 420, in the form of one or more processors, for executing program instructions. The exemplary computer platform includes an internal communication bus 410, program storage and data storage of different forms, e.g., disk 470, read only memory (ROM) 430, or random access memory (RAM) 440, for various data files to be processed and/or communicated by the computer, as well as possibly program instructions to be executed by the CPU. The computer 400 also includes an I/O component 460, supporting input/output flows between the computer and other components therein such as user interface elements 480. The computer 400 may also receive programming and data via network communications.

Hence, aspects of maximizing power on a mobile device, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In an embodiment, the described systems and methods may be implemented in the device operating system and applied to all geo-location information. In an embodiment, the described systems and methods are implemented using a preloaded application. In an embodiment, the systems and methods described herein are implemented using middleware between the operating system and an application. In an embodiment, the systems and methods are implemented in a cloud-based environment, where the device and application are in constant communication with a cloud-based server. In such an embodiment, the system's requests for measurements are all sent to the device and all measurements are sent back to the cloud. In an embodiment, the described methods may be implemented in a stand alone device without internet connectivity.

As will be appreciated by one skilled in the art, aspects of this disclosure can be embodied as a system, method or computer program product. Accordingly, aspects of the present disclosure can take the form of an entirely hardware embodiment, an entirely software embodiment (including firmware, resident software, micro-code, etc.) or as embodiments combining software and hardware aspects that can all generally be referred to herein as a "circuit," "module" or "system." Furthermore, aspects of the disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wire line, optical fiber cable, radiofrequency (RF), etc., or any suitable combination of the foregoing.

Computer program code for carrying out operations for aspects of the present disclosure can be written in any combination of one or more programming language, including an object oriented programming language, such as Java, Smalltalk, C++ or the like and conventional procedural programming language, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the steps can be performed in a differing order or steps can be added, deleted or modified. All of these variations are considered a part of the disclosure.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, the term "about" and/or "substantially" refers to a +/−10% variation from the nominal value/term. Such variation is always included in any given value/term provided herein, whether or not such variation is specifically referred thereto.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

It will be understood that those skilled in the art, both now and in the future, can make various improvements and enhancements which fall within the scope of the claims which follow.

What is claimed is:

1. A method for reducing power consumption on a mobile device comprising:
    obtaining, by a mobile device processor, sensor data from a sensor, wherein the sensor data is segmented into a series of segmented sensor portions, wherein each of the series of segmented sensor portions represents a user behavior characteristic;
    modeling, by the mobile device processor, first behavior data based on the series of segmented sensor portions;
    computing, by the mobile device processor, a rate of decay of confidence in the first behavior data based on the series of segmented sensor portions;
    selecting, by the mobile device processor, a first threshold level of confidence for requesting a behavior update from the sensor based on the series of segmented sensor portions;
    estimating, by the mobile device processor, a total decay of confidence in the first behavior data based on the series of segmented sensor portions;
    upon estimating that the total decay of confidence in the first behavior data exceeds the first threshold level of confidence, obtaining, by the mobile device processor, second behavior data;
    wherein a plurality of behavior modes for obtaining behavior information each uses a different level of power consumption; and
    selecting, by the mobile device processor, a behavior mode having a lowest level of power consumption to obtain the second behavior data.

2. The method of claim 1, wherein estimating, by the mobile device processor, a total decay of confidence in the first behavior data based on the series of segmented sensor portions uses historical data.

3. The method of claim 1, wherein the first behavior data and the second behavior data are derived from actions of an operator of the mobile device.

4. The method of claim 1, wherein the sensor is located in the mobile device.

5. The method of claim 1, further comprising: setting, by the mobile device processor, a second threshold level for requesting a second behavior update when the total decay exceeds the second threshold level.

6. The method of claim 5, further comprising: setting, by the mobile device processor, a third threshold level for requesting third behavior data when the total decay exceeds the third threshold level.

7. The method of claim 1, further comprising: calculating, by the mobile device processor, an additional threshold level for requesting an update when the total decay exceeds the additional threshold level.

8. The method of claim 1, wherein selecting the behavior mode is based at least in part on a required accuracy.

9. A method for reducing power consumption on a mobile device comprising:
receiving, at a modeling server, first behavior information from a mobile device processor operating with a monitoring module and a sensor that identifies a first attribute of the mobile device;
receiving, by the modeling server, sensor data from the mobile device processor operating with a sensor, wherein the sensor data is segmented into a series of segmented sensor portions, wherein each of the series of segmented sensor portions represents a user behavior characteristic;
modeling, by the modeling server, a plurality of actions based on the received sensor data;
computing, by the modeling server, a rate of decay of the first attribute;
selecting, by the modeling server, a first threshold level based on the modeling for requesting a behavior update from the mobile device processor operating with the monitoring module;
estimating, by the modeling server, a total decay from the first attribute;
upon estimating that the total decay from the first behavior exceeds the first threshold level, requesting, by the modeling server, second behavior information from the mobile device processor operating with the monitoring module, wherein the request for second behavior information includes an instruction to the mobile device processor to use one of a plurality of behavior modes for obtaining the second behavior information;
and wherein each behavior mode requires a different level of power consumption to obtain the second behavior information.

10. The method of claim 9, wherein the plurality of behavior modes comprises a user behavior mode.

11. The method of claim 10, wherein the user behavior mode is adjusted based on historical data.

12. The method of claim 11, wherein the historical data comprises location data.

13. The method of claim 9, further comprising: setting, by the mobile device, a second threshold level for requesting a second behavior update from the monitoring module when the total decay exceeds the second threshold level.

14. The method of claim 13, further comprising: setting, by the mobile device, a third threshold level for requesting a third behavior update from the monitoring module when the total decay exceeds the third threshold level.

15. The method of claim 9, further comprising: calculating, by the mobile device processor, an additional threshold level for requesting a behavior update from a behavior sensor when the total decay exceeds the additional threshold level.

16. The method of claim 9, wherein selecting the behavior mode is based at least in part on power requirements.

17. A mobile device comprising:
a memory; and
a processor used for reducing power consumption on the mobile device configured to:
obtain information from the mobile device processor that identifies a first attribute of the mobile device;
obtain sensor data from a sensor in the mobile device, wherein the sensor data is segmented into a series of segmented sensor portions, wherein each of the series of segmented sensor portions represents a user behavior characteristic;
model a behavior based on the obtained sensor data;
compute a rate of decay of the first attribute;
select a first threshold level, for requesting an update from the mobile device processor;
estimate a total decay from the first attribute;
upon estimating that the total decay from the first attribute exceeds the first threshold level, obtain a second attribute from the mobile device processor, wherein the mobile device processor controls a plurality of modes for obtaining information and each mode uses a different level of power consumption to obtain the information; and
select a mode with a lowest level of power consumption to obtain the second attribute.

18. The mobile device of claim 17, wherein at least one of the plurality of modes comprises a location-based mode.

19. The mobile device of claim 17, wherein at least one of the plurality of modes uses a user's calendar.

20. The mobile device of claim 17, wherein the processor is further configured to: set a second threshold level for requesting a second update from the mobile device processor when the total decay exceeds the second threshold level.

* * * * *